United States Patent [19]
Iwata

[11] Patent Number: 5,672,037
[45] Date of Patent: Sep. 30, 1997

[54] LOOSENING AND DISLODGING PREVENTING SCREW

[75] Inventor: Yukichi Iwata, Shinagawa, Japan

[73] Assignee: Iwata Bolt Kabushiki Kaisha, Tokyo-To, Japan

[21] Appl. No.: 547,998

[22] Filed: Oct. 25, 1995

[30] Foreign Application Priority Data

Nov. 1, 1994 [JP] Japan ................................. 6-268885
Nov. 7, 1994 [JP] Japan ................................. 6-272183

[51] Int. Cl.$^6$ ............................ F16B 39/30; F16B 35/04
[52] U.S. Cl. ........................ 411/311; 411/411; 411/436; 411/938
[58] Field of Search ............................ 411/309, 310, 411/311, 418, 938, 436, 411

[56] References Cited

U.S. PATENT DOCUMENTS

| | | | |
|---|---|---|---|
| Re. 27,678 | 6/1973 | Orlomoski | 411/311 |
| 3,517,717 | 6/1970 | Orlomoski | 411/311 |
| 4,252,168 | 2/1981 | Capuano | 411/311 |

Primary Examiner—Neill R. Wilson
Attorney, Agent, or Firm—Ladas & Parry

[57] ABSTRACT

The present invention relates to a male and female screw set wherein the male screw comprises at least a projecting part pressing against the flank plane of the female screw when the male and female screws are engaged. A dimensional difference is formed between the pitches of the female and male screw threads. When the female and male screws are engaged, the advancing side flank plane of the female screw thread is contacted by the advancing side flank plane of the male screw thread, while the other receding side flank plane of the female screw thread is contacted by other receding side flank plane of the male screw thread, and these respective flank planes are pressed together with tightening. In addition, the thread angle of the female screw is made approximately 1 degree 20 minutes to 3 degrees 30 minutes larger with respect to the male screw, so that when the male screw is taken as the standard thread angle, the respective flank angles of the male and female screw load threads mutually contact at the crest of the male screw when loaded, thereby preventing loosening and dislodging when the male and female screws are engaged.

7 Claims, 5 Drawing Sheets

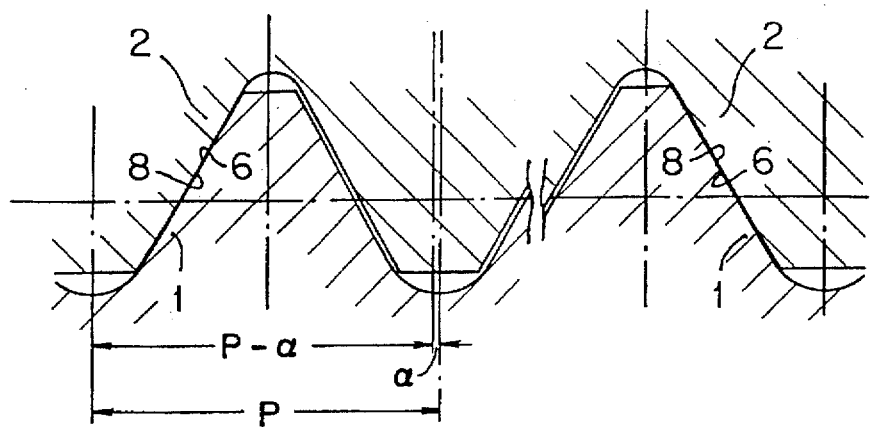
F I G. 7
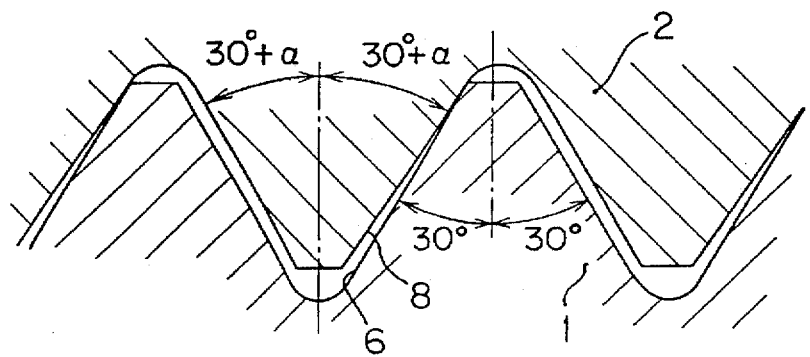
F I G. 8
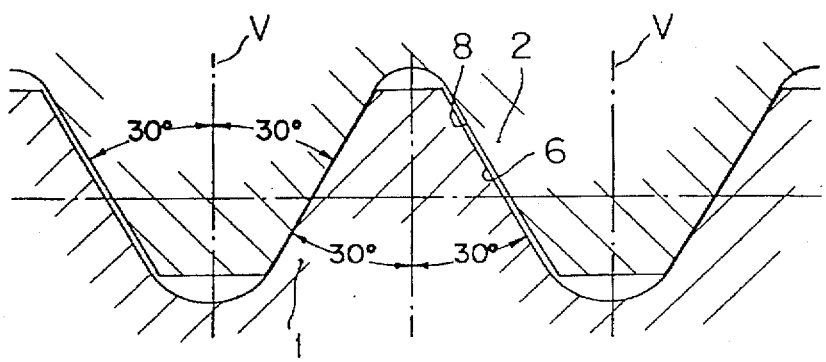
F I G. 9

LOOSENING AND DISLODGING PREVENTING SCREW

BACKGROUND OF THE INVENTION

The present invention relates to a screw used for fastening parts and in particular to a screw designed so as to prevent loosening and dislodging when male and female threads are engaged.

According to the conventionally used metric screw standard, as shown in FIG. 9, the male screw 1 thread angle is 60 degrees, comprising 30 degree opposing angles with respect to the axial perpendicular plane V. The female screw 2 as well is formed with the same thread angle.

However, in the case of a conventional screw 1 of this type, when a load is applied to the contacting threads during tightening, since the elastic deformation of angles of the male screw 1 exceeds that of the female screw 2, the surface pressure produced by the load in the the flank planes 6 and 8 is not uniform. While flank planes of the male screw 1 and female screw 2 remain in contact, the elastic deformation and load operating center operate eccentrically at the sides of roots of the male screw 1. Consequently, since the torque radius decreases, a problem was encountered whereby the male screw was loosened or dislodged.

SUMMARY OF THE INVENTION

The present invention recognizes the problems associated with the above type of conventional screw, and an objective is to provide a male screw whereby loosening and dislodging are absent between the male and female threads when the male and female threads are engaged and the respective flank planes are in linear contact.

In order to resolve the problems of the above mentioned prior art, in the case of this invention, a minimum of one projecting part is formed near the peak of the flank plane of the male screw thread. When the male and female threads are engaged, this projecting part is brought into pressing contact with the female thread flank plane, thereby preventing loosening and dislodging between the male and female screws.

In the case of a male screw according to this invention, since the male thread projecting part presses the female thread flank plane when the male and female screws are engaged, loosening and dislodging does not occur between the male and female screws.

In order to resolve the problems of the above mentioned prior art, in the case of this invention, a dimensional difference is formed between the female screw thread pitch and male screw thread pitch. As a result, when the female and male screws are engaged, the male screw thread advancing side contacts the flank plane of the female screw other thread receding side, thereby preventing loosening and dislodging between the female and male screws.

As a consequence of this construction, when the female screw and male screw engage, the male screw thread advancing flank plane contacts the female screw thread advancing flank plane, while other thread receding side flank plane of the male screw contacts other thread receding side flank plane of the female screw. Since tightening brings these into pressing contact, loosening and dislodging between the female and male screws do not occur.

In addition, in order to resolve the problems of the prior art mentioned above, a special feature in the case of this invention comprises making the thread half-angle of the female screw approximately 1 degree 20 minutes to 3 degrees 30 minutes larger with respect to the male screw, so that when the male screw is taken as the standard thread angle, the respective flank angles of the male and female screw threads loaded mutually contact at the male screw ridge angle part when loaded.

As a result of this construction, without reducing the screw thread strength, the surface pressure can be made uniform during loading when tightening. Since the torque radius can therefore be made large, loosening of the screws cannot easily occur.

BRIEF DESCRIPTION OF THE DRAWINGS

FIG. 7 is a partial enlarged vertical cross-sectional view of another embodiment of the screw shown in FIG. 6;

FIG. 8 is a partial enlarged vertical cross-sectional view showing the male and female thread engaged state of a screw according to the third embodiment; and FIG. 9 is a partial enlarged vertical cross-sectional view showing the thread shape of a conventional metric screw.

DETAILED DESCRIPTION OF THE PREFERRED EMBODIMENTS

[First Embodiment]

Following is a description of a first embodiment of this invention with reference to attached FIGS. 1–5.

Figure 1:
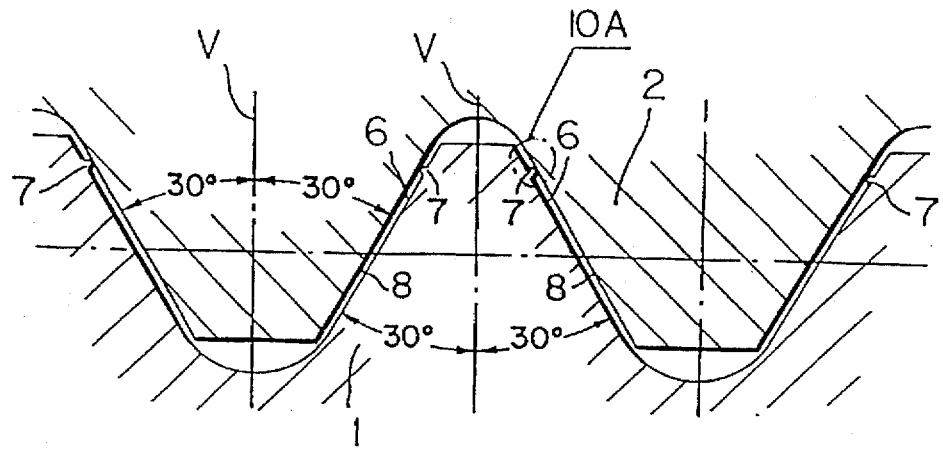
FIG. 1 is a partial enlarged cross-sectional view showing the male and female thread engaged state of a screw according to the first embodiment of this invention.
Figure 2:
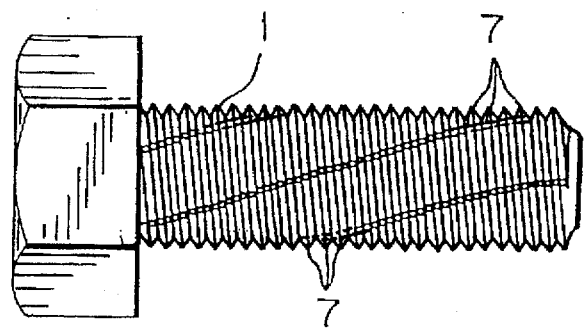
FIG. 2 is a lateral view of male screw threads according to this invention.
Figure 3:
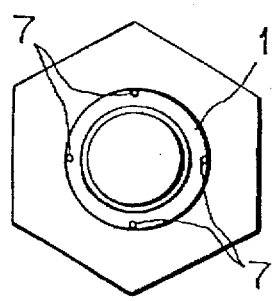
FIG. 3 is a direct view of the male screw shown in FIG. 2.

As indicated in FIG. 1, a screw 1 according to the first embodiment has a 60 degree thread angle comprising two 30 degree angles formed symmetrically with respect to axial perpendicular plane V. Near the peak area of the respective side flanks 6 of the threads, projecting parts 7 project from the flank plane 6. As shown in FIGS. 2 and 3, when viewed from the male screw axial direction, the projecting parts 7 are formed at 4 locations at 90 degree intervals in a spiral shape. The height of the projecting parts 7 is made slightly higher than the spacing when the male screw 1 and female screw 2 are engaged. These projecting parts 7, for example, can be formed with cross-sections comprising round cones, triangular cones, or squared cones, but are not limited to these shapes.

The female screw 2, as indicated in FIG. 1, has a 60 degree thread angle comprising two 30 degree angles formed symmetrically with respect to axial perpendicular plane V and comprises flank planes 8.

Figure 4:
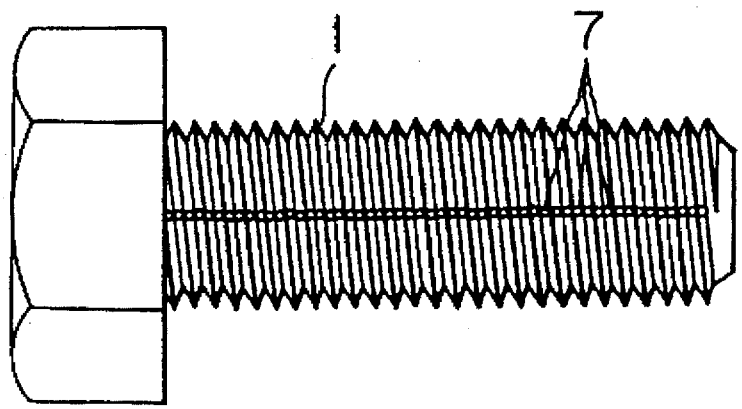
FIG. 4 is a lateral view of male screw threads shown in FIG. 2 according to another embodiment of this invention.
Figure 5:
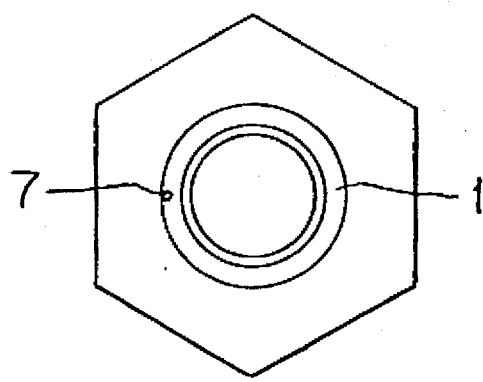
FIG. 5 is a direct view of the male screw shown in FIG. 4.

FIGS. 4 and 5 indicate a case when one projecting part 7 is respectively formed parallel with the axial line at both sides of the flank plane 6. Projecting parts 7 formed in the flank planes 6 in this manner, can be formed in either one location or a plurality of locations. These can also be formed in one side of the flank plane 6 or skipping every other angle, as determined according to the male screw 1 size and tightening torque.

Since a screw according to this invention has this type of construction, when the male screw 1 and female screw 2 are engaged and turned for tightening, the projecting part 7 of the flank plane 6 of the male screw 1 presses against the the flank plane 8 of the female screw 2. Consequently, even if slack occurs between the male screw 1 and female screw 2, and elastic deformation of the screw 1 threads occurs tending to dislodge the male screw 1, since the projecting part 7 of the male screw 1 presses against the flange plane 8 of the female screw 2, loosening and dislodging of the male screw 1 are prevented.

As described above, in the case of the first embodiment of this invention, at least a projecting part is formed projecting from the male screw thread flank plane near the flank plane. When the male and female screws are engaged, since this projecting part presses against the female screw flank plane, the male screw does not loosen when the male and female screws are tightened and used. Also, even should slack occur, since the projecting part presses against the flank plane of the female screw, the male screw does not dislodge, and a high reliability male screw can be provided at low cost.

[Second Embodiment]

Figure 6:
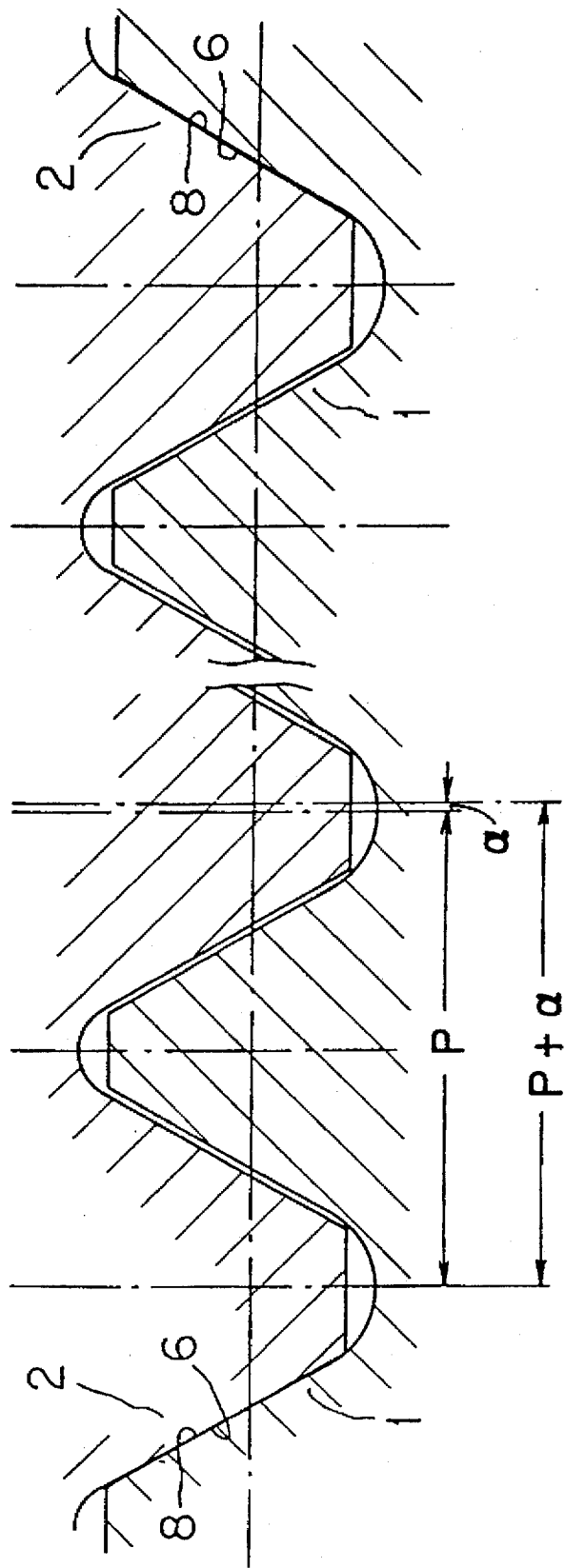
FIG. 6 is a partial enlarged cross-sectional view showing the male and female thread engaged state of a screw according to the third embodiment of this invention.
Figure 10A:
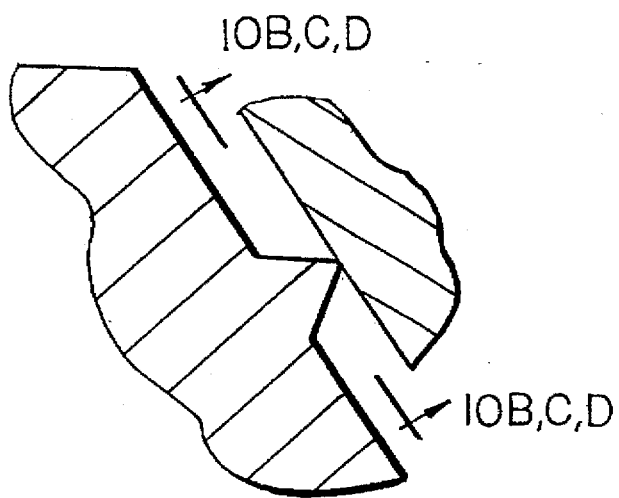
FIG. 10(a) is an enlarged view of one of the projecting parts 7 of FIG. 1.
Figure 10B:
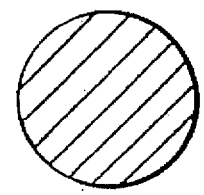
FIGS. 10(b)–(d) are cross-sectional views of the projecting part shown in FIG. 10(a) in each of three alternative embodiments.
Figure 10C:
Figure 10D:
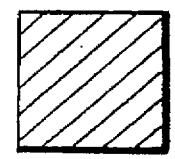

Following is a description of a second embodiment of this invention with reference to attached FIG. 6.

A female screw 2 according to this embodiment has a thread angle of 60 degrees, comprising two respectively symmetrical 30 degree angles with respect to the axial perpendicular. The screw thread pitch of the female screw 2 is formed slightly larger than the male screw pitch P at P+α.

Also, the male screw 1 has a thread angle of 60 degrees, comprising two respectively symmetrical 30 degree angles with respect to the axial perpendicular. The screw thread pitch is formed as P.

Since a screw according to the second embodiment is constructed in this manner, when the female screw 2 is engaged with the male screw 1 and slightly tightened, the advance side of the flank plane 6 of the female screw 2 thread presses against the advance side of the flank plane 8 of the male screw 1 thread, while because of the pitch dimension difference, the receding flank plane 8 of the female screw 2 is pressed by the receding side of the flank plane 6 of the male screw 1 thread.

Consequently, since the pressing flank planes exceed those of a conventional metric type female screw 2 and male screw 1 engagement, the thread load is distributed, and loosening and dislodging do not occur between the female screw 2 and male screw 1.

FIG. 7 shows a case wherein the female screw 2 pitch is formed by a slightly smaller amount α than the male screw 1 pitch P, and is thus P–α. Operation of this screw is the same as described above.

The above description of the second embodiment related to an example wherein the the pitch of the female screw 2 is formed as P+α or P–α with respect to the pitch P of the male screw 1. However, the description also applies to the opposite case, i.e., wherein the pitch of the male screw 1 is P+α or P–α with respect to the pitch P of the female screw 2.

As described in the foregoing, according to the second embodiment, a dimensional difference is formed between the female and male screw thread pitches. When the female and male screws are engaged, the advance side flank plane of the female screw thread is contacted by the advance side flank plane of the male screw thread, while the receding flank plane of the female screw of the other thread is pressed by the receding side flank plane of the male screw of the other thread. Since these are pressed together when tightened, the pressed flank planes are increased and loosening and dislodging do not occur between the female screw and male screw.

Consequently, screw detaching is absent, and since only a pitch difference is required, among the outstanding results is the ability to provide a high reliability screw at low cost.

[Third Embodiment]

Following is a description of a third embodiment of this invention with reference to the attached FIG. 8.

As shown in FIG. 8, the flank angle of the flank plane 8 of the female screw 2 is formed slightly larger (+α) than 30 degrees. As a result, distribution of the the contact pressure between the screw planes is uniform and matching thereof is excellent. Torque radius reduction is prevented and strength is increased with respect to contact stress.

The value of α, according to loosening tests when a 10 mm nominal diameter metric hexagonal nut is tightened at 200 kgf-cm, is between approximately 1 degree 30 minutes and 3 degrees 30 minutes, with a preferred value from 2 degrees 00 (zero) minutes to 3 degrees 00 (zero) minutes.

Table 1 indicates test results when the third embodiment of this invention is applied to nuts with female threads.

TABLE 1

| | Nut A | | | Nut B | | | Nut C | | |
| | Loosening torque kgf-cm | | | Loosening torque kgf-cm | | | Loosening torque kgf-cm | | |
| No. | Nut A | Standard nut | Time (second) | Nut B | Standard nut | Time (second) | Nut C | Standard nut | Time (second) |
| --- | --- | --- | --- | --- | --- | --- | --- | --- | --- |
| 1 | 60 | 0 | 75 | 125 | 0 | 96 | 20 | 0 | 54 |
| 2 | 75 | 0 | 33 | 120 | 0 | 56 | 0 | 90 | 81 |
| 3 | 120 | 0 | 38 | 90 | 0 | 62 | 0 | 50 | 50 |
| X | 85 | 0 | 48 | 111.6 | 0 | 71 | 6.66 | 46.6 | 61.6 |

In the table, the value of α is respectively 1 degree 20 minutes for nut A, 3 degrees 30 minutes for nut B and 5 degrees 45 minutes for nut C.

In the cases of both nuts A and B, considerable residual torque remains even when the standard nuts are completely loosened, while the opposite effect is observed with nut C. This is attributed to less favorable engagement with the bolt when the angle α is increased to 5 degrees 45 minutes. Consequently, the value α achieving the object of this invention is desired in the range of 1 degree 20 minutes to 3 degrees 30 minutes.

As described above, according to the third embodiment of this invention, the thread half-angle of the female screw is made approximately 1 degree 20 minutes to 3 degrees 30 minutes larger with respect to the male screw, so that when the male screw is taken as the standard thread angle, the respective flank angles of the male and female screw load threads mutually contact at the crest of the male screw when loaded.

As a result of this construction, without reducing the screw thread strength, the surface pressure can be made uniform during loading when tightening. Since the torque radius can therefore be made large, loosening of the screws cannot easily occur.

Also, Table 2 indicates examples of comparison tests of loosening prevention performance between cases wherein the female screw of this invention is applied to a uniform pressure nut, and various types of conventional nuts in general use. Tests were conducted in regard to M6 nuts using a test instrument for measuring loosening in the shaft perpendicular direction.

TABLE 2

| Loosening percentage | Nut type | | | | |
| --- | --- | --- | --- | --- | --- |
| | Standard hex. nut | Uniform press. flange nut | Nylon flange nut | All metal loosening prevention flange nut A | All metal loosening prevention flange nut B |
| Average value (%) of 5 test samples | 60.5 | 1.6 | 5.2 | 4.1 | 1.8 |

These test results indicate the loosening percentage of the uniform pressure nut declines at each step compared with the standard nut. Also, compared with the generally used loosening prevention nut, the same or greater loosening prevention performance is observed.

What is claimed is:

1. A male screw comprising a head, shaft, threads and at least one projecting part projecting from a male thread flank plane substantially near a peak part of said male thread flank plane such that, when the male screw is mated with a female screw, said projecting part presses against a female thread flank plane, thereby preventing loosening and dislodging between the male and female screws, said projecting part having a cone shape.

2. The male screw according to claim 1 comprising a plurality of projecting parts each of which is formed in parallel with a screw shaft center line on respective sides of said male thread flank plane.

3. The male screw according to claim 1 wherein the projecting part comprises a circular, triangular or rectangular cross section.

4. The male screw according to claim 1 comprising a plurality of projecting parts, said projecting parts being formed at four locations at 90 degree intervals in a spiral pattern as viewed from a shaft direction of the male screw.

5. A male screw comprising a head, shaft, threads and a plurality of projecting parts projecting from a male thread flank plane substantially near a peak part of said male thread flank plane such that, when the male screw is mated with a female screw, said projecting parts press against a female thread flank plane, thereby preventing loosening and dislodging between the male and female screws, said projecting parts being formed at four locations at 90 degree intervals in a spiral pattern as viewed from a shaft direction of the male screw.

6. The male screw according to claim 5 wherein at least one of the projecting parts is of conical shape.

7. The male screw according to claim 6 wherein the at least one projecting part of conical shape has a circular, triangular or rectangular cross section.

* * * * *